(12) United States Patent
Panchaksharaiah et al.

(10) Patent No.: US 12,081,840 B2
(45) Date of Patent: Sep. 3, 2024

(54) SYSTEMS AND METHODS FOR DISPLAYING A CONTENT ITEM BANNER

(71) Applicant: Rovi Guides, Inc., San Jose, CA (US)

(72) Inventors: Vishwas Sharadanagar Panchaksharaiah, Karnataka (IN); Vikram Makam Gupta, Karnataka (IN); Rupayan Dutta, West Bengal (IN); Sukanya Agarwal, Haryana (IN); Cato Yang, San Jose, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/863,256

(22) Filed: Jul. 12, 2022

(65) Prior Publication Data

US 2024/0022795 A1 Jan. 18, 2024

(51) Int. Cl.
*H04N 21/488* (2011.01)
*H04N 21/454* (2011.01)

(52) U.S. Cl.
CPC ....... *H04N 21/4886* (2013.01); *H04N 21/454* (2013.01)

(58) Field of Classification Search
CPC .................. H04N 21/4886; H04N 21/454
See application file for complete search history.

(56) References Cited

U.S. PATENT DOCUMENTS

| | | | |
|---|---|---|---|
| 10,417,272 B1* | 9/2019 | Carmack | G06F 16/44 |
| 2014/0297260 A1* | 10/2014 | Allen | G06F 3/04842 704/9 |
| 2015/0382061 A1* | 12/2015 | Maisenbacher | H04N 21/4542 725/28 |
| 2016/0066040 A1* | 3/2016 | Webster | H04N 21/44222 725/34 |
| 2016/0191999 A1* | 6/2016 | Friedrich | H04N 21/4821 725/39 |
| 2018/0270537 A1* | 9/2018 | Eriksson | H04N 21/4668 |
| 2019/0014367 A1* | 1/2019 | Thomas | H04N 21/458 |
| 2021/0406326 A1* | 12/2021 | Ebersol | G06F 16/483 |
| 2022/0222704 A1* | 7/2022 | Knudsen | G06Q 30/0255 |

\* cited by examiner

*Primary Examiner* — Kyu Chae
(74) *Attorney, Agent, or Firm* — Haley Guiliano LLP (57) ABSTRACT

Systems and methods are provided for generating a content item banner for display based on a session type and a content item type. A user profile is accessed at a computing device, and a session type associated with consumption of at least a content item of a plurality of content items is determined based on the user profile. A content item type associated with the plurality of content items is determined, and a content item banner for a subsequent content item of the plurality of content items is identified based on the session type and the content item type. The content item banner is generated for display.

20 Claims, 9 Drawing Sheets

SYSTEMS AND METHODS FOR DISPLAYING A CONTENT ITEM BANNER

BACKGROUND

The present disclosure is directed towards systems and methods for generating a content item banner for display. In particular, systems and methods are provided herein for generating a content item banner for display based on a session type and a content item type.

SUMMARY

The proliferation of content item delivery services, including over-the-top (OTT), streaming and video on demand (VOD) services, such as Netflix, Amazon Prime Video, Disney+ and Hulu, affords consumers of content items more choice than ever before. However, users of such services are increasingly finding it difficult to find and access content items that are of interest to them, in part due to the wide range of content items available to users. In order to help users find content items of interest, banners may accompany content items that are available via the service. Typically, a banner may comprise an image associated with the content item. In addition, many content item delivery services may have a number of banners associated with a single content item, and may select a banner for display based on, for example, a user profile used to log in to a content item delivery service. For example, if the user profile indicates that a user is male, a banner comprising a male lead may be displayed for a content item. Existing systems for displaying banners, however, may inadvertently lead to a poor user experience. For example, if an episode of a series of content items ended on a cliffhanger as to whether a male lead character is still alive and a banner comprising the lead character is displayed for a subsequent episode then if the user is consuming the series for the first time, the banner has given rise to a poor user experience because it has indicated that the lead character survived.

To overcome these problems, systems and methods are provided herein for generating a content item banner for display. In particular, systems and methods are provided herein for generating a content item banner for display based on a session type and a content item type.

In accordance with some aspects of the disclosure, a method is provided that includes accessing a user profile at a computing device and determining, based on the user profile, a session type associated with consumption of at least a content item of a plurality of content items. A content item type associated with the plurality of content items is determined, and a content item banner for a subsequent content item of the plurality of content items is identified based on the session type and the content item type. The content item banner is generated for display.

In an example system, a user profile may be identified via, for example, an OTT application running on, for example, a smart television. This may be the user profile that is used to access the OTT service. The user profile may be accessed to determined, for example, that a user has consumed a number, for example three, five, nine, of episodes of a series within a period of time, for example, the last five hours. Based on the number of episodes consumed and the period of time, it may be determined that the session type is a binge-watching session, where a user consumes a plurality of episodes back-to-back, or without a substantial break in between episodes. A content item type is determined for the consumed episodes. For example, it may be determined that the episodes comprise an overarching storyline that continues from episode to episode. This may be determined, for example, via metadata associated with the episodes and/or via a service accessible via the internet. In this example, as the user is binge-watching episodes, and because the episodes comprise an overarching storyline, it may be identified that content item banners that do not comprise a spoiler should be displayed for subsequent episodes of the series. The identified content item banners are generated for display, and, for example, are displayed, via the OTT application at the smart television when the user browses content items in the OTT application and/or when an "up next" user interface element is displayed at the end of an episode.

A user interface element associated with an application running on the computing device may be identified, and identifying the content item banner may further comprise identifying the content item banner based on the user interface element.

Generating the content item banner for display may further comprise applying a masking element to the content item banner to generate a masked content item banner for display. The masked content item banner may be displayed, an input may be received at the computing device, and the masking element may be removed from the content item banner in response to receiving the input.

A content item consumption progress associated with the plurality of content items may be accessed. A second content item banner may be identified, based on the session type, the content item type and the content item consumption progress.

The content item type may indicate whether there is a common plot and/or storyline between at least a subset of the plurality of content items. In response to an indication of a common plot and/or storyline, identifying the content item banner may further comprise identifying a banner that does not comprise a spoiler. The content item type may indicate whether there is a common genre between at least a subset of the plurality of content items, and metadata associated with the plurality of content items may be accessed. In response to an indication of a common genre, and based on the metadata, identifying the content item banner may further comprise identifying a banner that does not comprise a spoiler. The content item type may be one of a first content item type or second content item type. The first content item type may indicate that a degree of connectedness between the plurality of content items is at or above a threshold level, and the second content item type may indicate that the degree of connectedness between the plurality of content items is below the threshold level.

A plurality of banners may be associated with the subsequent content item. The session type may indicate that a number of content items consumed in a session is at or above a threshold level. Identifying the content item banner may further comprise determining, based on image processing, which of the plurality of banners comprises a spoiler, and identifying a banner that does not comprise a spoiler. The session type may indicate that at least a subset of the plurality of content items have been consumed. Identifying the content banner may further comprise determining, based on image processing, which of the plurality of banners comprises a spoiler, and identifying a banner that comprises a spoiler. The session type may indicate that none of the plurality of content items have been consumed. Identifying the content banner may further comprise determining, based on image processing and the user profile, which banners of the plurality of banners are likely to generate interest in the content item.

BRIEF DESCRIPTIONS OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

The above and other objects and advantages of the disclosure may be apparent upon consideration of the following detailed description, taken in conjunction with the accompanying drawings, in which.

DETAILED DESCRIPTION

Systems and methods are described herein for generating a content item banner for display. A content item includes audio, video, text and/or any other media content. A content item may be a single media content item; in other examples it may be a series (or season) of episodes of media content items. Audio includes audio-only content, such as podcasts. Video includes audiovisual content such as movies and/or television programs. Text includes text-only content, such as event descriptions. One example of a suitable media content item is one that complies with the MPEG DASH standard. An OTT, streaming and/or VOD service (or platform) may be accessed via a website and/or an app running on a computing device and may receive any type of content item, including live content items and/or on-demand content items. Content items may, for example, be streamed to physical computing devices. In another example, content items may, for example, be streamed to virtual computing devices in, for example, a virtual environment and/or the metaverse.

A session type is an indication of how content items are being consumed. A session type may be determined, for example, by accessing, via a user profile, a history of content item consumption. For example, the session type may comprise a binge-watching session, where multiple content items are being consumed back-to-back and/or without a substantial pause in between different content items. In the case of a binge-watching session type, it may be determined, for example, whether a relatively large number of items have been recently consumed or, for example, that a plurality of content items that have been consumed immediately previously fit, or closely fit, the immediate time period of consumption (e.g., that five content items, each lasting an hour, have been consumed in the last five hours). Another way of determining a binge-watching session may be to monitor how many content items have been consumed back-to-back since, for example, an OTT application was accessed. As the number of back-to-back content items increases, a confidence level associated with identifying a binge-watching session may also increase. In another example, a session type may indicate that this is the first time that a plurality of content items has been consumed. In another example, the session type may indicate that one or more content items are being re-consumed. The session type may indicate that a subsection of a plurality of content items has already been consumed, for example, the first few episodes of a series of content items. In another example, a session type may be a regular session type, for example, where one or two content items are being consumed.

A content item type may indicate whether a plurality of content items are related, or are not related. For example, the content item type may indicate that the plurality of content items are episodic content items, are serial content items, comprise overlapping storylines and/or characters, and/or comprise related genres and/or the same genre, and/or comprise related and/or the same actors. In some examples, the content item type may indicate a hybrid, wherein the plurality of content items comprises both elements of an overarching storyline and individual, unconnected stories. For example, a police series where the main character solves a different crime each episode, but that also contains an ongoing romance between two of the main characters may be indicated as a hybrid content item type. The content item type may be determined via metadata associated with the plurality of content items, via an application programming interface (API) for querying an internet-connected service and/or via a trained artificial intelligence algorithm. The content item type querying service may be part of the OTT platform and/or may be provided by a third party to the OTT provider.

A banner is any image that is associated with a content item, for example in the user interface of an OTT application. A banner may comprise, for example, one or more pictures, one or more screenshots, one or more thumbnails, one or more video clips, a title, a summary, ratings information and/or icons, characters in the content item, main actors in the content item and/or guest roles in the content item, or any combination of the same. The screenshots and/or video clips may be captured from a content item, and/or the thumbnails may be generated from a content item. The pictures, screenshots, thumbnails, video clips, title, summary, ratings information, characters in the content item, main actors in the content item, and/or guest roles in the content item may be identified via metadata associated with a banner and/or via an API for querying an internet-connected service. Any part of a banner may be accessed via an API for querying an internet-connected service. The banner querying service may be part of the OTT platform and/or may be provided by a third party to the OTT provider. A banner may also, or additionally, be generated by a trained artificial intelligence algorithm. A banner may be displayed at any suitable time, for example, in a user interface of an application of a content delivery service provider. In particular, banners are typically displayed proximal to a listing for a content item. In other examples, banners may be displayed with an up-next alert, a playing and/or loading now user interface element, and/or lists of content items (including, for example, a banner associated with the list and/or banners associated with elements of the list), such as episode lists. In some examples, a user interface type may be determined, and the content item banner may be selectively identified based on the user interface type.

Spoilers are anything (including, for example, words, phrases, icons, images, audio and/or video clips) associated with a content item that indicate or reveal a plot, character, storyline, or other development that may reduce surprise and/or suspense for a first-time consumer of the media content item. For example, if a main character were to be fired from their job at the end of an episode of a series, a spoiler would be something that conveys this information.

The disclosed methods and systems may be implemented on one or more computing devices. As referred to herein, the computing device can be any device comprising a processor and memory, for example, a television, a smart television, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, a smartwatch, a smart speaker, an augmented reality device, a mixed reality device, a virtual reality device, or any other television equipment, computing equipment, or wireless device, and/or combination of the same.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media cards, register memory, processor caches, random access memory (RAM), etc.

Figure 1:
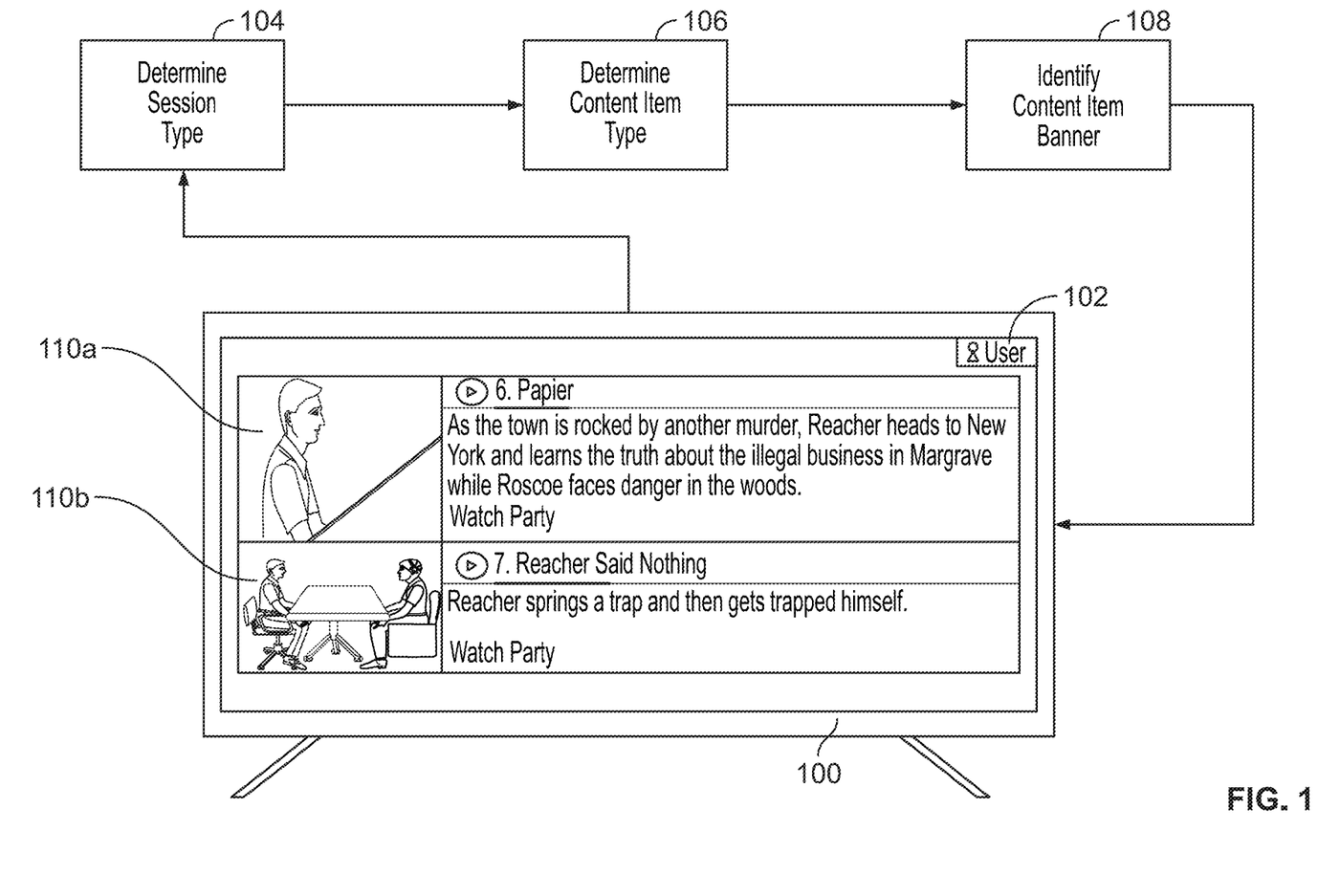
FIG. 1 shows an example environment in which a content item banner is generated for display, in accordance with some embodiments of the disclosure.

FIG. 1 shows an example environment in which a content item banner is generated for display, in accordance with some embodiments of the disclosure. The environment comprises smart television 100, though in other examples the smart television may be any suitable computing device including, for example, a smartphone, a laptop and/or a tablet device. An application associated with, for example, an OTT service runs on the smart television 100. A user may log in to the application using, for example, a profile associated with the OTT service. In response to, for example, a request to display a content item banner for a content item, or content items, the user profile 102 may be accessed at the smart television 100. A session type associated with the consumption of at least a content item of a plurality of related content items is determined 104, based on the user profile. For example, the user profile 102 may comprise a history of consumed content items, and the session type may be determined based on this history. For example, the watch history may be used to determine that a relatively large plurality of content items, for example six content items, have been consumed since the OTT application was accessed by a user. In this example, the session type may be identified as a binge-watching session type. A content item type associated with the plurality of content items is determined 106. For example, the content item type may be determined via metadata associated with the plurality of content items.

A content item banner is identified 108, based on the session type and the content item type, for at least a subsequent content item of the plurality of content items. A content item banner may be accessed via an API for querying an internet-connected service. The content item banner is generated for display, and is displayed, at the smart television 100. In this example, content item banners 110a, 110b are displayed for two subsequent episodes of a series of episodes that is being consumed. Any of the elements of the process associated with determining 104 the session type, determining 106 the content item type and/or identifying 108 a content item banner (or banners) may take place at the smart television 100 and/or at a server, as discussed in connection with FIG. 2 below.

In order to determine a session type when a user first interacts with a user interface element, for example of an OTT application, or starts consuming a content item, for example the first episode of a series, user consumption history and/or other data may be accessed in order to determine the session type. The user consumption history may be accessed via, for example, a user profile. For example, a given user profile may indicate that multiple content items are routinely consumed at certain days and/or times. The consumption history and/or a calendar associated with the user profile may be analyzed to generally indicate that more time is available for a potential binge-watching session. In another example, a user scrolling through different content categories may be indicative of a session type. In a further example, a user selecting a particular title that is associated with multiple episodes may be indicative of a session type, and similarly the title being in a particular genre, with particular actors and/or characters, may be indicative of a session type. In another example, the session type may be based on device type (e.g., a smart television, a mobile device, or a tablet device). In another example, the session type may be based on new releases and the popularity of different content items. Any combination of the aforementioned examples is contemplated.

The session type may indicate whether a threshold period of time has elapsed since one or more content items of the plurality of content items was consumed, and/or whether the content item has previously been consumed. The session type may be one of a first session type or a second session type. The first session type may indicate that a number of content items consumed in a session is at or above a threshold level, and the second session type may indicate that the number of content items consumed in the session is below the threshold level.

In some examples, the content item type may indicate whether there is a common plot and/or storyline between at least a subset of the plurality of content items. If there is a common plot and/or storyline, identifying the content item banner may further comprise identifying a banner that does not comprise a spoiler. Such a system may improve a user experience, for example, by enabling them to avoid spoilers in content item banners.

The content item type may indicate whether there is a common genre between at least a subset of the plurality of content items, and metadata associated with the plurality of content items may be accessed. If there is a common genre, and based on the metadata, identifying the content item banner may further comprise identifying a banner that does not comprise a spoiler. For example, the genre may be a comedy, which typically may not comprise a common plot and/or storyline between content items. On identifying that the genre is comedy, metadata associated with the content items may be accessed, for example to identify whether there are main characters that are common to a plurality, or a threshold number, of content items of the plurality of content items. If there are not main characters that are common to a plurality of episodes, or that are common to a plurality of episodes that are below a threshold number, then a content banner that comprises a spoiler may be identified. Such a system may improve a user experience, for example, by generating interest in key parts of subsequent episodes.

Figure 2:
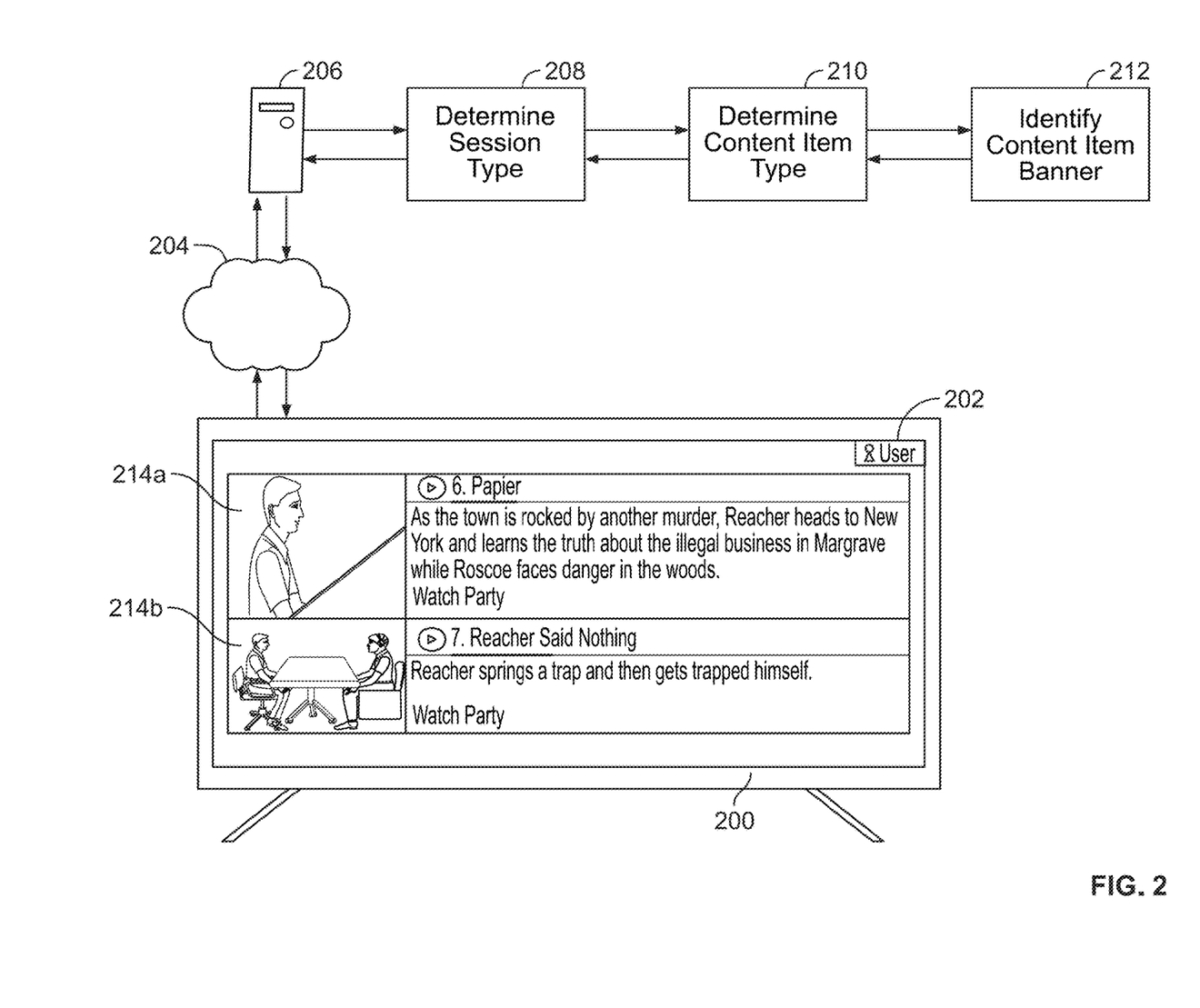
FIG. 2 shows another example environment in which a content item banner is generated for display, in accordance with some embodiments of the disclosure.

FIG. 2 shows another example environment in which a content item banner is generated for display, in accordance with some embodiments of the disclosure. In a similar manner to the environment shown in FIG. 1, the environment comprises a smart television 200 and, additionally, a server 206. An application associated with, for example, an OTT service runs on the smart television 200. A user may log in to the application using, for example, a profile associated with the OTT service. In response to, for example, a request to display a banner, or banners, for a content item in the OTT application, the request may be transmitted, via a network 204, such as the internet, to the server 206. The network 204 may comprise wired and/or wireless means. The user profile 202 is accessed at the server 206, and a session type associated with the consumption of at least a content item of a plurality of related content items is determined 208, based on the user profile. A content item type associated with the plurality of content items is also determined 210 at the server 206.

A content item banner is identified 212, based on the session type and the content item type, for at least a subsequent content item of the plurality of content items. The identified content item banner, or banners, is transmitted from the server 206, via the network 204, to the smart television 200. The content item banner is generated for display, and is displayed, at the smart television 200. In this example, content item banners 214a, 214b are displayed for two subsequent episodes of a series of episodes that is being consumed. The server 206 may comprise a single physical or virtual server. In other examples, elements of the process associated with determining 208 the session type, determining 210 the content item type and/or identifying 212 a content item banner (or banners) may take place on different physical or virtual servers.

Figure 3:
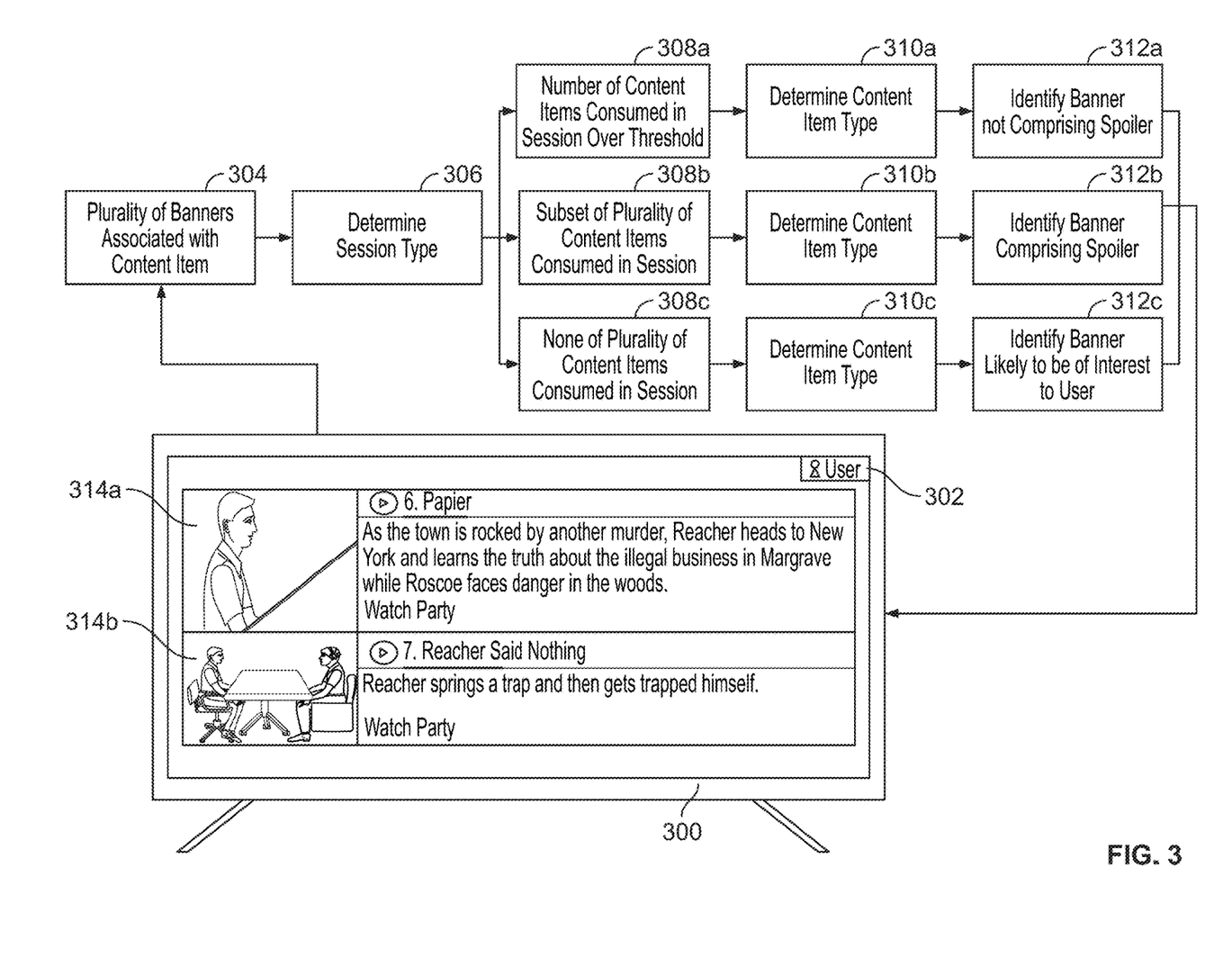
FIG. 3 shows another example environment in which a content item banner is generated for display, in accordance with some embodiments of the disclosure.

FIG. 3 shows another example environment in which a content item banner is generated for display, in accordance with some embodiments of the disclosure. In a similar manner to the environment shown in FIGS. 1 and 2, the environment comprises a smart television 300. An application associated with, for example, an OTT service runs on the smart television 300. A user may log in to the application using, for example, a profile associated with the OTT service. In response to, for example, a request to display a content item banner for a content item, or content items, the user profile 302 may be accessed at the smart television 300.

A plurality of banners 304 are associated with the content item, for example, one of two, three, or six different banners may be displayed with a content item. A session type associated with the consumption of at least a content item of a plurality of related content items is determined 306, based on the user profile. The session type indicates either that a number of content items consumed in a session is at or above a threshold level 308a, that at least a subset of the plurality of content items have been consumed 308b or that none of the plurality of content items have been consumed 308c. A content item type associated with the plurality of content items is also determined 310.

In the case where a number of content items consumed in a session is above a threshold level 308a, the session type may be indicative of a binge-watching session. In this example, a banner that does not comprise a spoiler is identified 312a based on the session type and the content item type, for example via image processing. In the case where at least a subset of the plurality of content items have been consumed 308b, for example, previously consumed a period of time ago, such as, for example, six months or a year, a banner that comprises a spoiler is identified 312b based on the session type and the content item type, for example via image processing, because, for example, the user will already be aware of any spoilers, and the spoilers may generate interest and/or remind the user about the content item. In the case where none of the plurality of content items have been consumed 308c, a banner that is likely to generate interest in the content item is identified 312c based on the session type and the content item type, for example, via the user profile and image processing. The content item banner is generated for display, and is displayed, at the smart television 300. In this example, content item banners 314a, 314b are displayed for two subsequent episodes of a series of episodes that is being consumed. Any of the elements of the process associated with determining 306 the session type 308a, 308b, 308c, determining 310 the content item type and/or identifying 312a, 312b, 312c a content item banner (or banners) may take place at the smart television 300 and/or at a server, as discussed in connection with FIG. 2 above.

Figure 4:
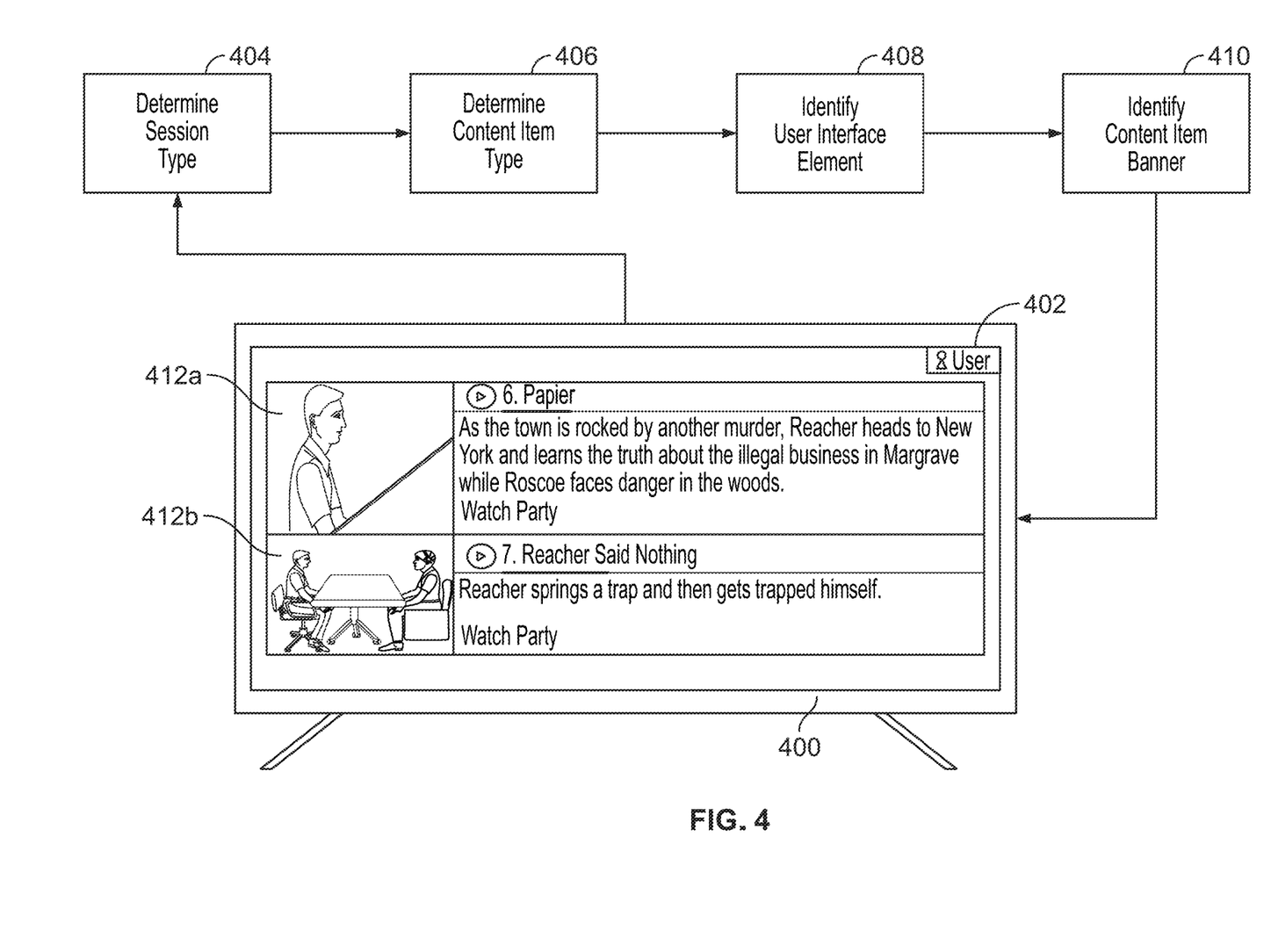
FIG. 4 shows another example environment in which a content item banner is generated for display, in accordance with some embodiments of the disclosure.

FIG. 4 shows another example environment in which a content item banner is generated for display, in accordance with some embodiments of the disclosure. In a similar manner to the environment shown in FIGS. 1-3, the environment comprises a smart television 400. An application associated with, for example, an OTT service runs on the smart television 400. A user may log in to the application using, for example, a profile associated with the OTT service. In response to, for example, a request to display a banner, or banners, for a content item in the OTT application, the user profile 402 may be accessed at the smart television. A session type associated with the consumption of at least a content item of a plurality of related content items is determined 404, based on the user profile. A content item type associated with the plurality of content items is also determined 406. A user interface element is identified 408. For example, the user interface element may be a user interface element of an OTT application. The user interface element may comprise an up-next alert; a playing and/or loading now user interface element; and/or lists of content items (including, for example, a banner associated with the list and/or banners associated with elements of the list), such as episode lists.

A content item banner is identified 410, based on the session type, the content item type and the user interface element, for at least a subsequent content item of the plurality of content items. In some examples, a setting may be provided that enables an override based on a user interface element. For example, a setting may prevent spoilers from being displayed with an up-next alert, irrespective of the session type and/or the content item type. In other examples, the session type, content item type and user interface element may be given different weightings, for example 25%, 35% and 40%. The weightings may be taken into account when identifying 410 the content item banner. The identified content item banner is generated for display, and is displayed, at the smart television 400. In this example, content item banners 412a, 412b are displayed for two subsequent episodes of a series of episodes that is being consumed. In some examples, the content item banners may be displayed with the identified user interface element. Any of the elements of the process associated with determining 404 the session type, determining 406 the content item type, identifying 408 a user interface element and identifying 410 a content item banner (or banners) may take place at the smart television 400 and/or at a server, as discussed in connection with FIG. 2 above.

Figure 5:
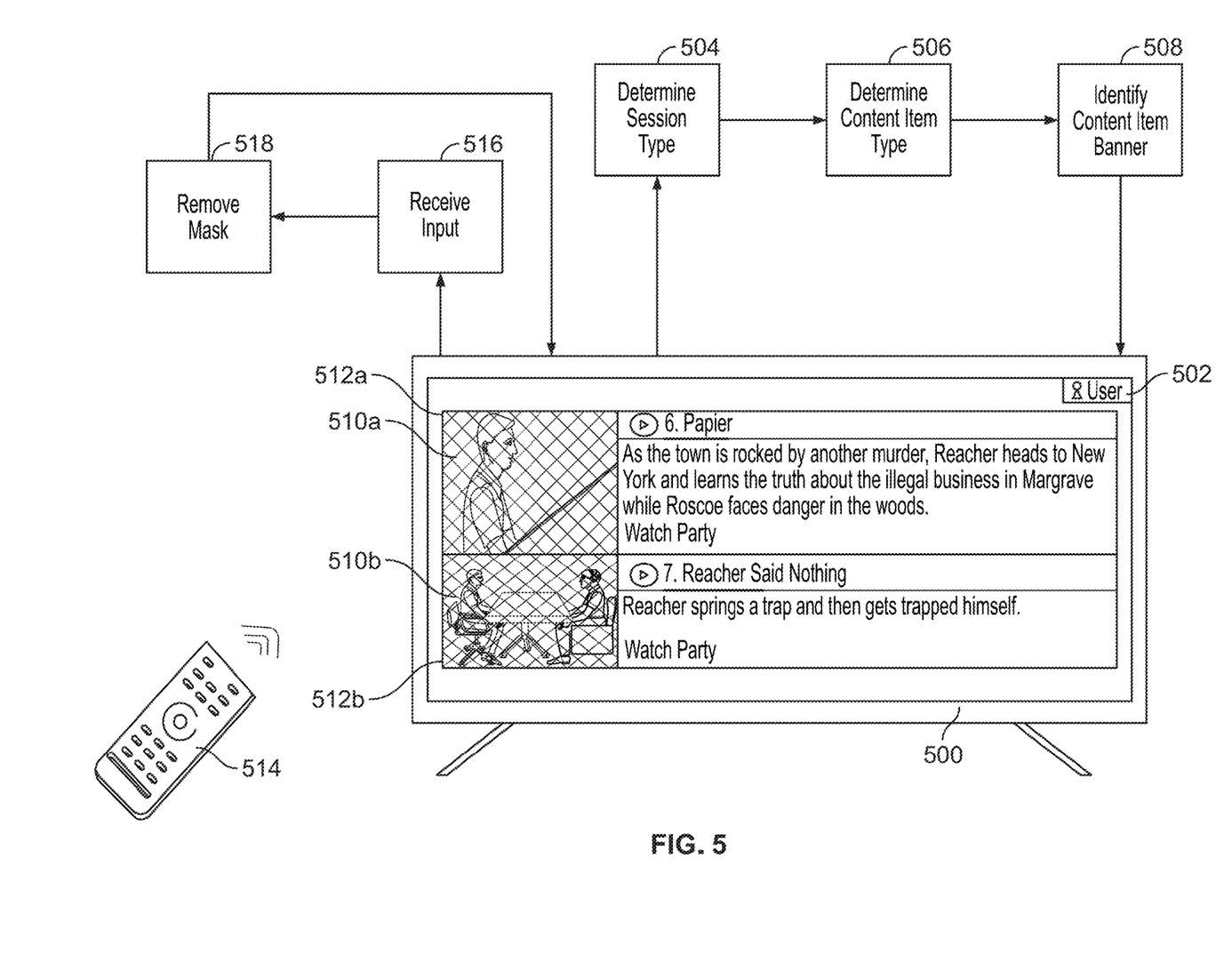
FIG. 5 shows another example environment in which a content item banner is generated for display, in accordance with some embodiments of the disclosure.

FIG. 5 shows another example environment in which a content item banner is generated for display, in accordance with some embodiments of the disclosure. In a similar manner to the environment shown in FIGS. 1-4, the environment comprises a smart television 500. An application associated with, for example, an OTT service runs on the smart television 500. A user may log in to the application using, for example, a profile associated with the OTT service. In response to, for example, a request to display a banner, or banners, for a content item in the OTT application, the user profile 502 may be accessed at the smart television. A session type associated with the consumption of at least a content item of a plurality of related content items is determined 504, based on the user profile. A content item type associated with the plurality of content items is also determined 506.

A content item banner is identified 508, based on the session type, the content item type and the user interface element, for at least one subsequent content item of the plurality of content items. The identified content item banner is generated for display, at the smart television 500. In this example, content item banners 510a, 510b are generated for display for two subsequent episodes of a series of episodes that is being consumed. In addition, masking elements 512a, 512b are applied to the content item banners 510a, 510b to prevent the content item banners from being seen. The masking elements 512a, 512b may be anything that prevents the content item banners from being seen. For example, the masking elements can apply a blur effect to the content item banners 510a, 510b. In another example, the masking elements can, partially or completely, obscure the content item banners 510a, 510b.

A user may provide an input via, for example, remote control 514. In other examples, an input may be received via any input device, for example, an infrared controller, Bluetooth and/or Wi-Fi controller, a touchscreen of a computing device, a keyboard, a mouse and/or a microphone. In response to receiving the input 516, the masking elements 512a, 512b may be removed from the content item banners 510a, 510b. In some examples, a specific input is monitored for at 516, and the masking elements 512a, 512b are removed in response to receiving a specific input, or category of inputs, such as a scroll down command, a select an episode command and/or a play command. Any of the elements of the process associated with determining 504 the session type, determining 506 the content item type, identifying 508 a content item banner (or banners) and/or applying and/or removing the masking elements 512a, 512b may take place at the smart television 500 and/or at a server, as discussed in connection with FIG. 2 above.

Figure 6:
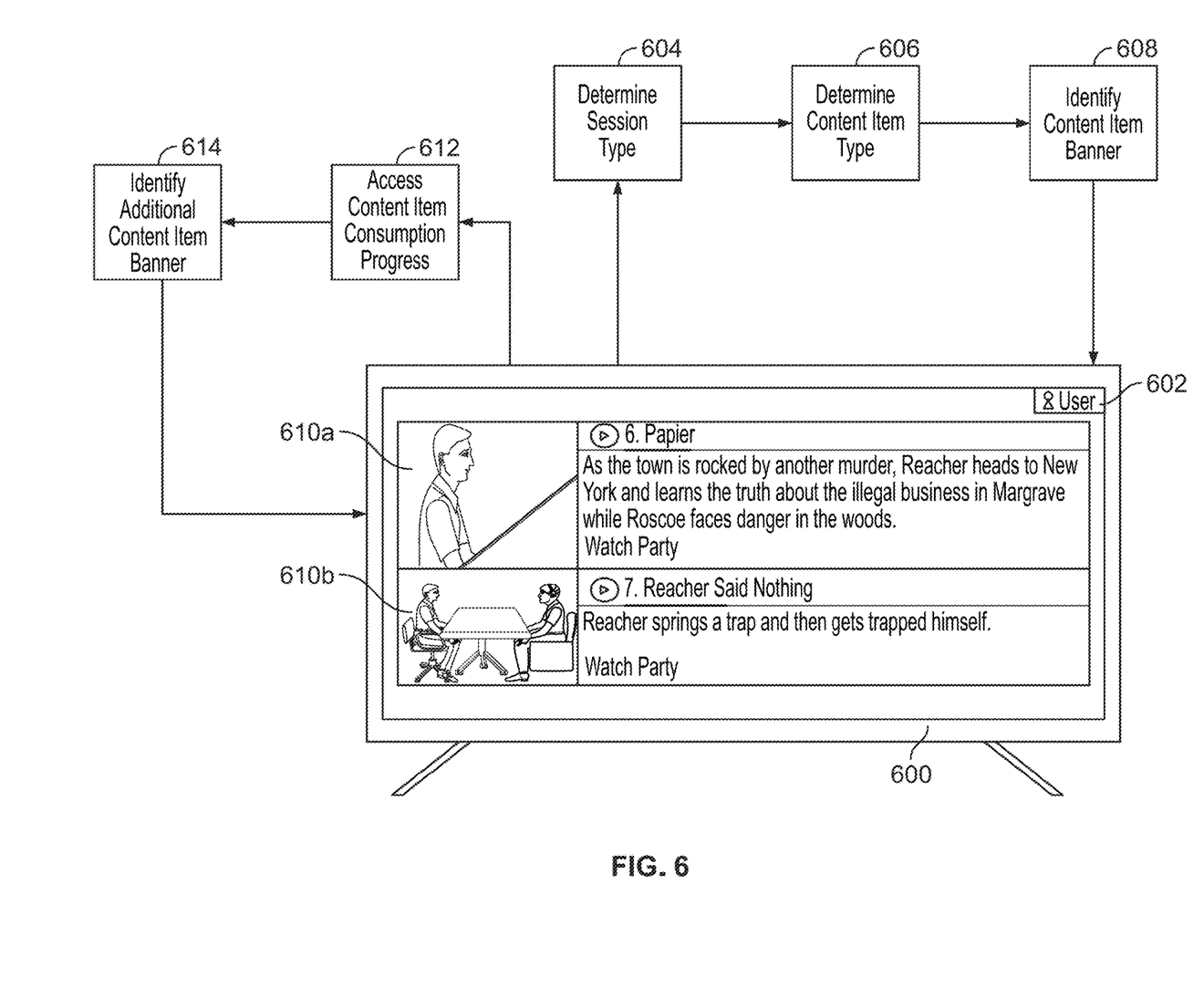
FIG. 6 shows another example environment in which a content item banner is generated for display, in accordance with some embodiments of the disclosure.

FIG. 6 shows another example environment in which a content item banner is generated for display, in accordance with some embodiments of the disclosure. In a similar manner to the environment shown in FIGS. 1-5, the environment comprises a smart television 600. An application associated with, for example, an OTT service runs on the smart television 600. A user may log in to the application using, for example, a profile associated with the OTT service. In response to, for example, a request to display a banner, or banners, for a content item in the OTT application, the user profile 602 may be accessed at the smart television. A session type associated with the consumption of at least a content item of a plurality of related content items is determined 604, based on the user profile. A content item type associated with the plurality of content items is also determined 606.

A content item banner is identified 608, based on the session type, the content item type and the user interface element, for at least a subsequent content item of the plurality of content items. The identified content item banner is generated for display, at the smart television 600. In this example, content item banners 610a, 610b are generated for display, and are displayed, for two subsequent episodes of a series of episodes that is being consumed. In order to display different content item banners, as a content item is consumed, a content item consumption progress is accessed 612. For example, this may comprise accessing a consumption progress of a particular content item via the user profile 602. An additional content item banner is identified 614 based on the accessed content item progression. For example, it may be identified that certain plot points associated with a content item have been watched, and it may be determined that a banner that previously comprised a spoiler no longer comprises a spoiler and hence may be displayed. In some examples, multiple additional content item banners may be identified based on the accessed content item progression, and an additional content item banner may be identified from the multiple additional content item banners. On identifying the additional content item banner, the original content item banner is updated with the new content item banner. In this example, content item banners 610a, 610b are updated at the smart television 600. Any of the elements of the process associated with determining 604 the session type, determining 606 the content item type, identifying 608 a content item banner (or banners), accessing 612 a content item consumption progress and/or identifying 614 an additional content item banner may take place at the smart television 600 and/or at a server, as discussed in connection with FIG. 2 above.

In some examples, a content item banner (or banners) associated with a user interface element (or elements) of, for example, an OTT application may be updated as a particular content item is consumed, and as multiple content items are consumed during a session. For example, a user that has not yet consumed a new series may first view an episode list for the series, which may be populated with content item banners that are intended to generate interest (and possibly include spoilers). As the user consumes episodes of the series, content item banners associated with user interface elements, such as the up-next, playing now, and/or episode list user interface elements, may be updated so that the content item banners do not comprise spoilers. If the user returns to the episode list at a later time (for example, a day, three days, a week, or a month later), then the content item banners may revert to the original banners that were intended to generate interest in the series.

Figure 7:
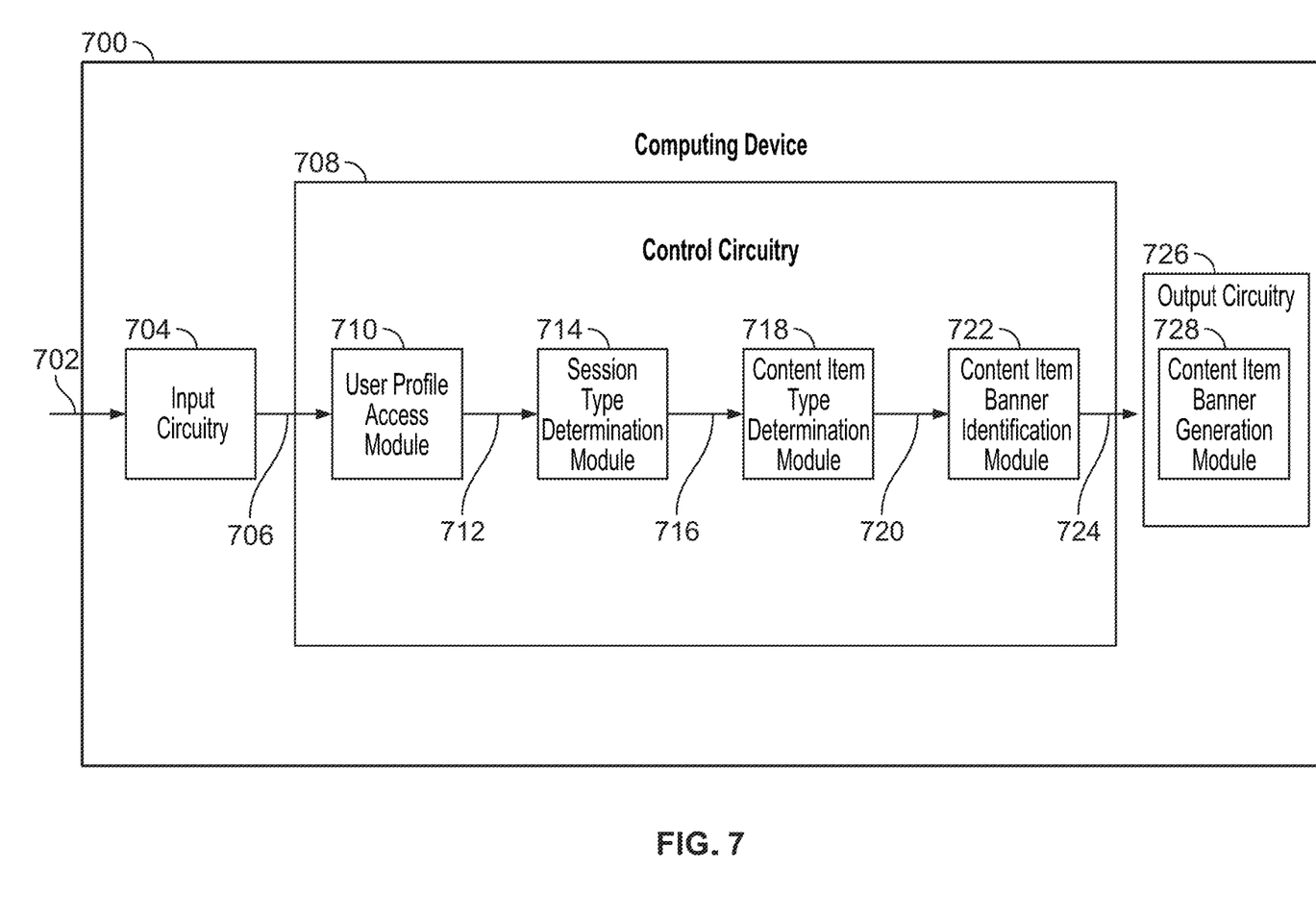
FIG. 7 shows a block diagram representing components of a computing device and data flow therebetween for generating a content item banner for display, in accordance with some embodiments of the disclosure.

FIG. 7 shows a block diagram representing components of a computing device and data flow therebetween for generating a content item banner for display, in accordance with some embodiments of the disclosure. Computing device 700 (e.g., smart television 100, 200, 300, 400, 500, 600) as discussed above comprises input circuitry 704, control circuitry 708 and output module 726. Control circuitry 708 may be based on any suitable processing circuitry (not shown) and comprises control circuits and memory circuits, which may be disposed on a single integrated circuit or may be discrete components and processing circuitry. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i9 processors) or multiple different processors (e.g., an Intel Core i5 processor and an Intel Core i7 processor) and/or a system on a chip (e.g., a Qualcomm Snapdragon 888). Some control circuits may be implemented in hardware, firmware, or software.

Input is received by the input circuitry 704. The input circuitry 704 is configured to receive inputs related to a computing device. For example, this may be via an infrared controller, Bluetooth and/or Wi-Fi controller of the computing device 700, a touchscreen, a keyboard, a mouse and/or a microphone. In another example, the input may comprise instructions received via another computing device. The input circuitry 704 transmits 706 the user input to the control circuitry 708.

The control circuitry 708 comprises a user profile access module 710, a session type determination module 714, a content item type determination module 718, and a content item banner identification module 722. The input is transmitted 706 to the user profile access module 710, where a user profile is accessed, for example a user profile associated with a content item delivery service. On accessing the user profile, an indication of the user profile is transmitted 712 to the session type determination module 714, where the session type is determined. An indication of the session type is transmitted 716 to the content type determination module 718, where a content type is determined. An indication of the session type and an indication of the content item type are transmitted 720 to the content item banner identification module 722, where a content item banner is identified. The identified content item banner is transmitted 724 to the output circuitry 726, where the content item banner is generated for display by the content item banner generation module 728.

Figure 8:
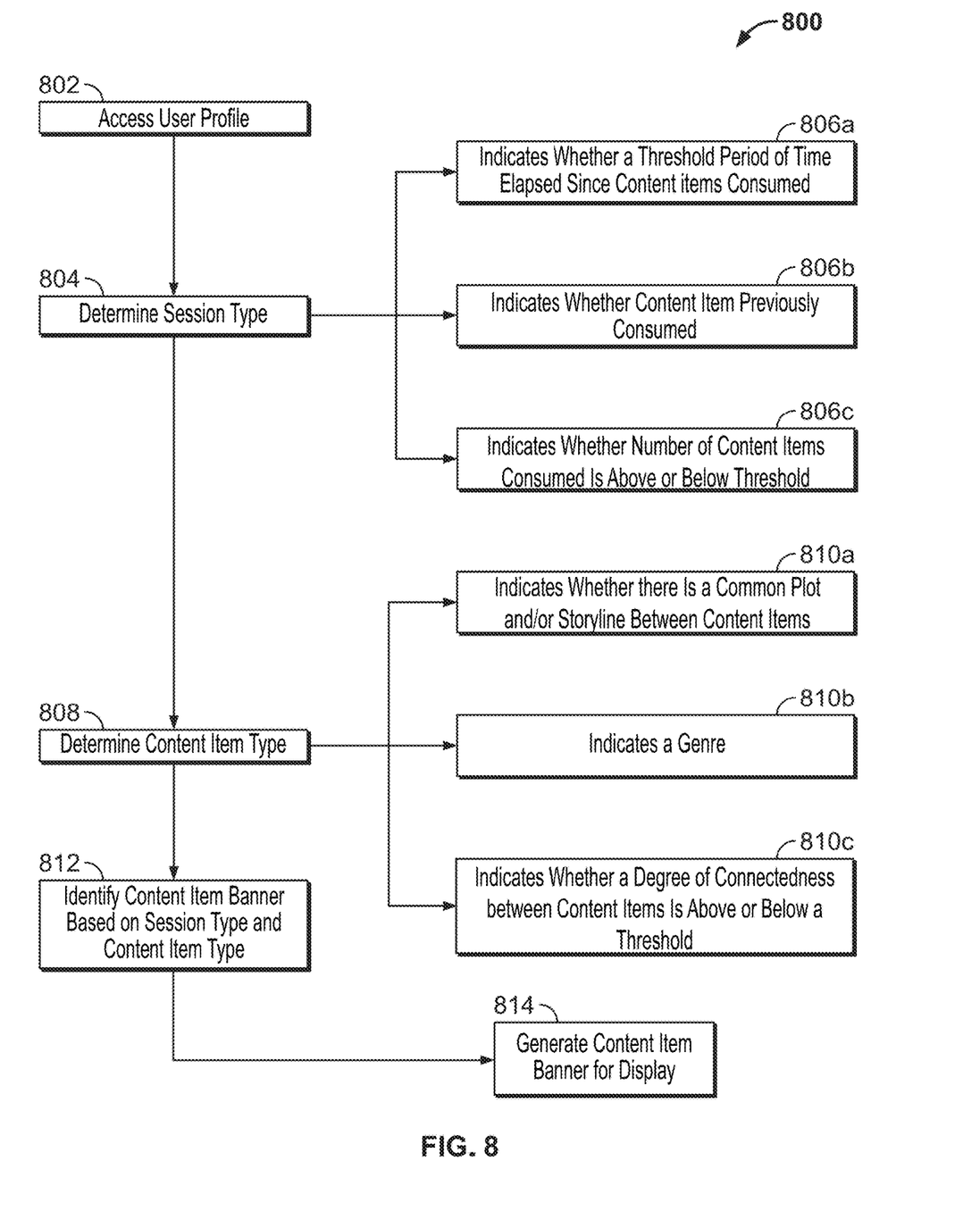
FIG. 8 shows a flowchart of illustrative steps involved in generating a content item banner for display, in accordance with some embodiments of the disclosure.

FIG. 8 shows a flowchart of illustrative steps involved in generating a content item banner for display, in accordance with some embodiments of the disclosure. Process 800 may be implemented on any of the aforementioned computing devices (e.g., smart television 100, 200, 300, 400, 500, 600). In addition, one or more actions of the process 800 may be incorporated into or combined with one or more actions of any other process or embodiments described herein.

At 802, a user profile is accessed, and at 804 a session type is determined. The session type may indicate 806a whether a threshold period of time has elapsed since one or more content items of the plurality of content items were consumed, and/or may indicate 806b whether the content item has previously been consumed. The session type may also, or alternatively, indicate 806c that the number of content items consumed in a session is at or above a threshold level. A content item type is determined 808. The content item type may indicate 810a whether there is a common plot and/or storyline between at least a subset of the plurality of content items, and/or may indicate 810b a genre. The content item type may also, or alternatively, indicate 810c that there is a degree of connectedness between the plurality of content items that is at or above a threshold level. At 812, a content item banner is identified based on the session type and the content item type. At 814, the content item is generated for display.

Figure 9:
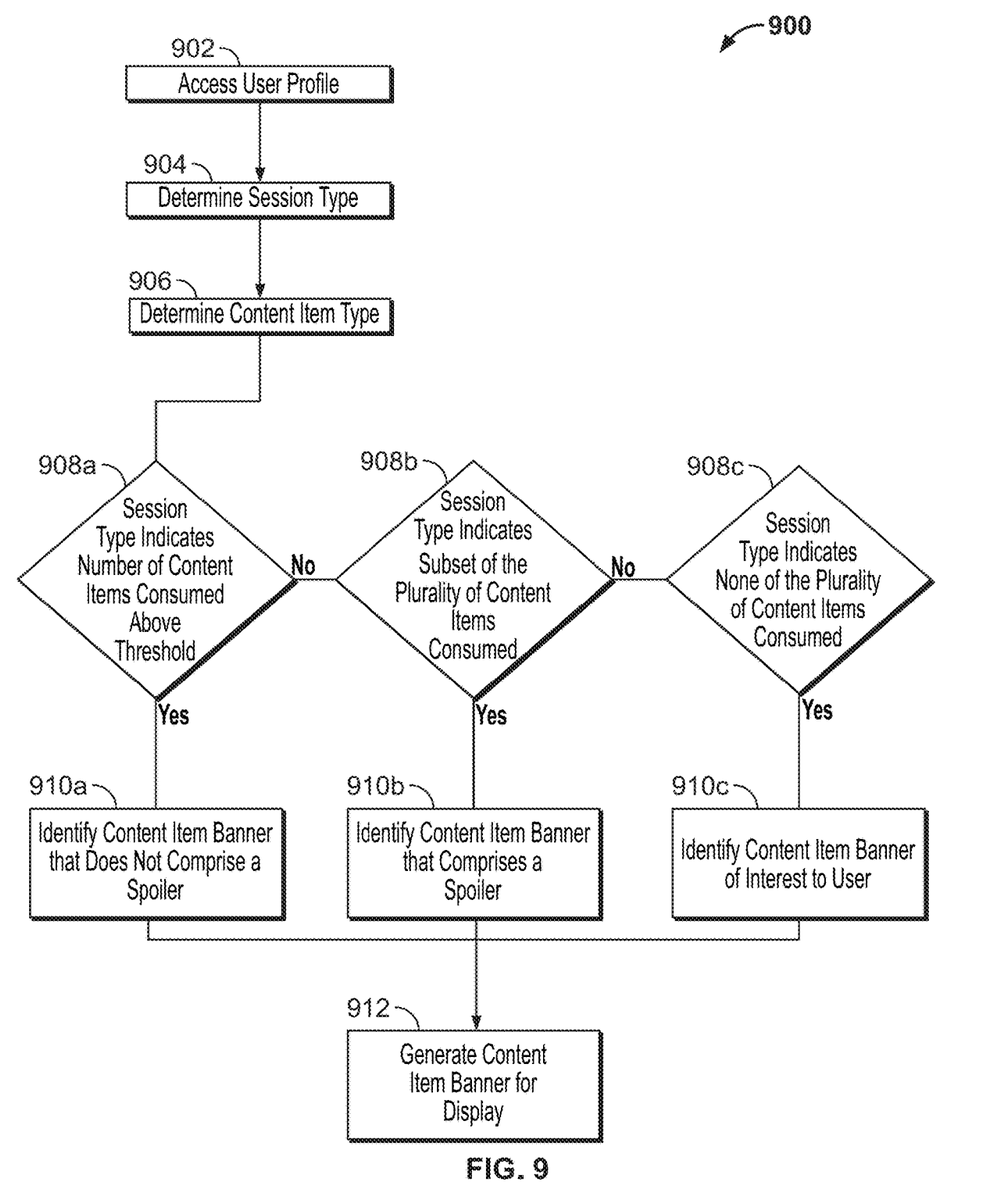
FIG. 9 shows another flowchart of illustrative steps involved in generating a content item banner for display, in accordance with some embodiments of the disclosure.

FIG. 9 shows another flowchart of illustrative steps involved in generating a content item banner for display, in accordance with some embodiments of the disclosure. Process 900 may be implemented on any of the aforementioned computing devices (e.g., smart television 100, 200, 300, 400, 500, 600). In addition, one or more actions of the process 900 may be incorporated into or combined with one or more actions of any other process or embodiments described herein.

At 902, a user profile is accessed, at 904 a session type is determined, and at 906 a content item type is determined. At 908a, it is determined whether the session type indicates that the number of content items consumed in a session is at or above a threshold level, and, if it is above the threshold level, at 910a, a content item banner is identified that does not comprise a spoiler. If not, at 908b, it is determined whether the session type indicates that at least a subset of the plurality of content items have been consumed, and, if they have been consumed, at 910b a content item banner is identified that comprises a spoiler. If not, at 908c, it is determined whether the session type indicates that none of the plurality of content items have been consumed, and, if none of the plurality of content items have been consumed, at 910c, a content item banner is identified that is likely to generate interest in the content item. For example, it may be identified, based on the user profile, that a user is interested in fast cars. In this example, a content item banner comprising a fast car may be generated. In another example, it may be identified that a user is interested in a particular actor that is in a content item. In this example, a content item banner comprising the actor may be generated. At 912, the respective content item banner is generated for display.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be example and not limiting. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   accessing a user profile;
   identifying, based on the user profile, that a plurality of content items of a series have been continuously consumed within a time period that corresponds to a duration of the plurality of the content items;
   determining, based on the consumption of the plurality of content items within the time period, that a session type associated with the consumption of the plurality of content items is a binge watching session type;
   identifying a plurality of content item banners associated with the plurality of content items;
   determining a first subset of the plurality of content item banners that comprise a spoiler for a subsequent content item of the series, and a second subset of the plurality of content item banners that do not comprise a spoiler for the subsequent content item;
   determining a content item type associated with the plurality of content items;
   selecting, from the second subset of the plurality of content item banners, and based on the session type being a binge watching session type and the content item type, a particular content item banner that comprises a depiction of a character, associated with the series, that does not comprise a spoiler for the subsequent content item of the plurality of content items; and
   generating the particular content item banner for display.

2. The method of claim 1, further comprising:
   identifying a user interface element associated with an application running on a computing device, wherein the particular content item banner is displayed at the computing device; and
   wherein identifying the particular content item banner further comprises identifying the particular content item banner based on the user interface element.

3. The method of claim 1, wherein generating the particular content item banner for display further comprises applying a masking element to the particular content item banner to generate a masked content item banner for display, the method further comprising:
   causing the masked content item banner to be displayed;
   receiving an input; and
   removing the masking element from the particular content item banner in response to receiving the input.

4. The method of claim 1, wherein:
   the method further comprises accessing a content item consumption progress associated with the user profile and the plurality of content items; and
   identifying the particular content item banner further comprises identifying the particular content item banner based on the content item consumption progress.

5. The method of claim 1, wherein:
   the content item type indicates whether there is a common plot and/or storyline between at least a subset of the plurality of content items and the subsequent content item.

6. The method of claim 1, wherein the content item type indicates a genre common to at least a subset of the plurality of content items, the method further comprising:
   accessing metadata associated with the plurality of content items; and
   in response to an indication of a common genre, and based on the metadata, identifying the particular content item banner.

7. The method of claim 1, wherein the content item type is one of a first content item type or second content item type, and wherein:
   the first content item type indicates that a degree of connectedness between the plurality of content items and the subsequent content item is above a threshold level; and
   the second content item type indicates that the degree of connectedness between the plurality of content items and the subsequent content item is below the threshold level.

8. The method of claim 1, wherein:
   the session type indicates that a number of content items consumed in a session associated with the consumption of the plurality of content items is above a threshold level; and
   image processing is used to determine that the particular content item banner does not comprise a spoiler.

9. The method of claim 1, wherein:
   the subsequent content item is a first subsequent content item;
   the session type indicates at least a subset of the plurality of content items have been consumed; and
   identifying a content item banner for a second subsequent content item of the series by:
      determining, based on image processing, the first subset of the plurality of content item banners that comprise a spoiler; and
      identifying a content item banner of the first subset that comprises a spoiler; and
      applying a masking element to the identified content banner that comprises a spoiler, wherein the masking element at least partially obscures the particular content item banner.

10. The method of claim 1, wherein:
    identifying the particular content banner further comprises determining, based on image processing and the user profile, which content item banners of the plurality of content item banners are likely to generate interest in the subsequent content item.

11. A system, the system comprising:
    a communication port;
    a memory storing instructions; and
    control circuitry communicably coupled to the memory and the communication port and configured to execute the instructions to:
       access a user profile;
       identify, based on the user profile, that a plurality of content items of a series have been continuously consumed within a time period that corresponds to a duration of the plurality of the content items;
       determine, based on the consumption of the plurality of content items within the time period, that a session type associated with the consumption of the plurality of content items is a binge watching session type;
       identify a plurality of content item banners associated with the plurality of content items;
       determine a first subset of the plurality of content item banners that comprise a spoiler for a subsequent content item of the series, and a second subset of the plurality of content item banners that do not comprise a spoiler for the subsequent content item;
       determine a content item type associated with the plurality of content items;
       select, from the second subset of the plurality of content item banners, and based on the session type being a binge watching session type and the content item type, a particular content item banner that comprises a depiction of a character, associated with the series, that does not comprise a spoiler for the subsequent content item of the plurality of content items; and generate the content item banner for display.

12. The system of claim 11, wherein:
the control circuitry is further configured to identify a user interface element associated with an application running on a computing device, wherein the particular content item banner is displayed at the computing device; and
the control circuitry configured to identify the particular content item banner is further configured to identify the particular content item banner based on the user interface element.

13. The system of claim 11, wherein:
the control circuitry configured to generate the particular content item banner for display is further configured to apply a masking element to the particular content item banner to generate a masked content item banner for display; and
the control circuitry is further configured to:
cause the masked content item banner to be displayed;
receive an input; and
remove the masking element from the particular content item banner in response to receiving the input.

14. The system of claim 11, wherein:
the control circuitry is further configured to access a content item consumption progress associated with the user profile and the plurality of content items; and
the control circuitry configured to identify the particular content item banner is further configured to identify the particular content item banner based on the content item consumption progress.

15. The system of claim 11, wherein:
the content item type indicates whether there is a common plot and/or storyline between at least a subset of the plurality of content items and the subsequent content item.

16. The system of claim 11, wherein:
the content item type indicates a genre common to at least a subset of the plurality of content items;
the control circuitry is further configured to access metadata associated with the plurality of content items; and in response to an indication of a common genre, and based on the metadata, the control circuitry configured to identify the particular content item banner.

17. The system of claim 11, wherein the content item type is one of a first content item type or second content item type, and wherein:
the first content item type indicates that a degree of connectedness between the plurality of content items and the subsequent content item is above a threshold level; and
the second content item type indicates that the degree of connectedness between the plurality of content items and the subsequent content item is below the threshold level.

18. The system of claim 11, wherein:
the session type indicates that a number of content items consumed in a session associated with the consumption of the plurality of content items is above a threshold level; and
image processing is used to determine that the particular content item banner does not comprise a spoiler.

19. The system of claim 11, wherein:
the subsequent content item is a first subsequent content item;
the session type indicates at least a subset of the plurality of content items have been consumed; and
the control circuitry configured to identify a content item banner for a second subsequent content item of the series is further configured to:
determine, based on image processing, the first subset of the plurality of content item banners that comprise a spoiler; and
identify a content item banner of the first subset that comprises a spoiler; and
apply a masking element to the banner that comprises a spoiler, wherein the masking element at least partially obscures the content item banner.

20. The system of claim 11, wherein:
the control circuitry configured to identify the particular content item banner is further configured to determine, based on image processing and the user profile, which content item banners of the plurality of content item banners are likely to generate interest in the subsequent content item.

* * * * *